United States Patent Office 2,985,615
Patented May 23, 1961

2,985,615
UNSATURATED POLYESTER REACTION PRODUCTS, COPOLYMERS THEREOF, AND PROCESS OF PRODUCING SAME

Roelf Tunteler, Delft, Netherlands, assignor to Nederlandse Organisatie voor Toegepast-Natuurweten-Schappelijk Onderzoek Ten Behoeve van Nijverheid, Handel en Verkeer, The Hague, Netherlands, a corporation of the Netherlands
No Drawing. Filed May 19, 1954, Ser. No. 430,967
Claims priority, application Netherlands May 23, 1953
6 Claims. (Cl. 260—45.4)

This invention relates to the production of unsaturated polyesters suitable for co-polymerization with other unsaturated organic compounds to produce resins, resin-like products, lacquers, and the like, and to the process of producing said unsaturated polyesters and said co-polymerization products, and to the products produced thereby.

One of the objects of the invention is to produce unsaturated polyesters of aromatic compounds of different molecular weights over a wide range and with variable degrees of unsaturation.

Another object of the invention is to produce unsaturated polyesters of aromatic compounds of variable molecular weights over a wide range and with variable degrees of unsaturation, and to further co-polymerize these unsaturated polyesters of aromatic compounds with monomeric aromatic compounds having at least one unsaturated organic radical to produce resins and resin-like products.

Another object of the invention is to provide a process whereby unsaturated polyesters of aromatic hydrocarbons may be produced with a relatively high degree of unsaturation and with a wide range of molecular weights at a lower cost than unsaturated polyesters have heretofore been produced.

Another object of the invention is to provide a process whereby unsaturated polyesters of aromatic hydrocarbons may be produced with a relatively high degree of unsaturation and with a wide range of molecular weights, and co-polymerized with monomeric organic compounds having at least one unsaturated organic radical whereby resinous condensation products may be produced.

Various other objects and advantages of this invention will appear as this description proceeds.

Unsaturated polyesters which are co-polymerizable with unsaturated organic compounds are now in great demand for various purposes such as for the production of objects reinforced with glass fibres, such as reinforced plastics for the manufacture of pipes, automobile bodies and many other products. Normally the unsaturated polyesters which are used for co-polymerization with various unsaturated organic products capable of producing resins of resin-like masses are produced by reacting glycols with unsaturated dicarboxylic acids or anhydrides, as, for instance, maleic anhydride. In these esters the relatively expensive maleic anhydride is often at least partially replaced by substances such as phthalic anhydride. However, the cost of these unsaturated polyesters as heretofore produced is relatively high because of the initial high cost of the glycols and of the other reacting materials.

It is known that various aromatic compounds can be condensed with formaldehyde in an acid medium and that these condensation products, such as, for example, xylene formaldehyde resins, can be converted with a great many different substances (generally under the influence of acid catalysts), as, e.g., with phenols, reactive aromatic compounds such as anthracene, sulphonamides, alcohols, organic acids and esters, into resins or resin-like products. On condensing xylene-formaldehyde resins with monocarboxylic acids, products are formed which have a much lower viscosity than the xylene-formaldehyde starting resin. On condensing xylene-formaldehyde resins with saturated dicarboxylic and polycarboxylic acids more viscous to insoluble products are formed. These conversion reactions start only at temperatures higher than 140° C. and are only completed at approximately 180° C. at a reasonable velocity; as a rule, 0.1–0.3% paratoluene sulphonic acid or sulphonyl chloride is used as a catalyst.

On attempting to condense a xylene-formaldehyde resin with an unsaturated dicarboxylic acid, as e.g. maleic acid, high-melting resins result in a very short time which are converted into insoluble products, which are not further reactive, shortly afterwards.

These resins are not useful in themselves nor can they be used as starting material for co-polymerization with unsaturated organic compounds. This reaction is, however, made use of in the prior art to prevent the decrease of the softening point by addition of a slight quantity of maleic acid during the condensation, which decrease would take place if xylene-formaldehyde resin alone is condensed with various other substances.

The conversion or condensation by the addition of a co-reacting substance to a reaction mixture consisting of an aromatic compound and formaldehyde, e.g. xylene and formaldehyde, during the condensation has also been used in the prior art; for example, paratoluene sulphonamide and various ketones have been mentioned for this purpose. It is also known that acids sometimes co-react during the acid condensation of xylene and formaldehyde, provided they are present in a high concentration, whereby ester groups of substituted benzyl alcohols are formed besides methylene, ether and acetal groups.

On homogeneously condensing xylene and formaldehyde, dissolved in acetic acid, only very few ester groups are formed. When the condensation takes place in formic acid as a solvent, no ester groups whatever are found to have been formed.

It has also been proposed to produce resinous material from hydrocarbon oils by reaction with aldehydes and small amounts of polycarboxylic acids in the presence of a condensing agent (see United States Patent No. 2,395,739).

Although these various reactions of aromatic hydrocarbons with aldehydes and polycarboxylic acids have been described in the literature, these reactions lead invariably to the production of saturated compounds or compounds of such a low degree of unsaturation that they are not materially further reactive, and which therefore cannot be copolymerized with unsaturated organic compounds to produce strong resinous bodies, and therefore cannot be substituted or used in place of the more expensive unsaturated polyesters produced from unsaturated dicarboxylic acids and glycols.

I have discovered that unsaturated polyesters may be produced from aromatic hydrocarbon compounds, which are much cheaper to produce than the unsaturated polyesters of the prior art, and which may be further co-polymerized with unsaturated organic compounds to produce strong resins or resin-like bodies.

I have discovered that such desirable unsaturated polyesters of aromatic hydrocarbons may be produced by reacting at a temperature below 150° C. a mixture consisting of: (1) aromatic hydrocarbons or aromatic ethers, in which hydrogen may be replaced by halogen, or ketones with (2) formaldehyde or polymers thereof, and (3) an unsaturated carboxylic acid or unsaturated carboxylic anhydride having at least one double bond at position $\alpha$-$\beta$ with respect to carboxyl, in the presence of an acid catalyst. The polyesters produced according to my invention contain only a relatively small quantity of unsaturated acid and are excellently suited to be co-polymerized with other unsaturated compounds.

Unsaturated carboxylic acids which are suitable for use in the process of this invention are, for example, maleic acid, fumaric acid, itaconic acid, aconitic acid, crotonic acid, etc. The unsaturated carboxylic acids can partially be replaced by saturated dicarboxylic acids or anhydrides thereof such as, for example, adipic acid, azelaic acid, sebacic acid, phthalic acid or phthalic anhydride, isophthalic acid or tetrachlorophthalic acid or the anhydride thereof, terephthalic acid or a mixture of such acids, provided a substantial amount of the unsaturated carboxylic acid is used. Partial substitution of the unsaturated carboxylic acids may also be made by monocarboxylic acids, as, for example, 1-ethyl pentane carboxylic acid-1 or pelargonic acid. The percentage of substitution for the unsaturated acids must not be so high that the resulting product is no longer co-polymerizable with other unsaturated organic compounds.

When unsaturated dicarboxylic acids are condensed with aromatic hydrocarbons and an aldehyde according to the processes hereinafter described, unsaturated polyesters of relatively high molecular weight may be produced. If a mixture of an unsaturated monocarboxylic acid, as for example crotonic acid with an unsaturated dicarboxylic acid, is used, products suitable for co-polymerization are formed; however, the molecular weight of these products is relatively low. If only unsaturated monocarboxylic acid is used, a polyester with a very low molecular weight, which can, however, also be co-polymerized, is obtained.

The condensation reaction takes place on heating, preferably at temperatures of approximately 100 to 130° C.

Aromatic compounds which are suitable for use in the process of this invention are, for example, toluene, ethylbenzene, xylene, mesitylene, diphenyl (phenyl-benzene), diphenylmethane, diphenyloxide, tetralin, naphthalene, alkylbenzene ethers and resorcinal-dialkylethers, or mixtures thereof such as mixed fractions from petroleum oil. Instead of these substances also reactive ketones, such as cyclohexanone and acetophenone, may be subjected to condensation and co-polymerization according to the processes hereinafter described. Also halogen-containing aromatic compounds may be used; these, however, generally give less favorable results.

As aldehydes, I prefer to use formaldehyde or polymers thereof, although any aldehyde or compound containing an aldehyde group which has the property of condensing with cyclic hydrocarobns and carboxylic acids, or anhydrides thereof, may be used. Various catalysts may be used as hereinafter described.

The unsaturated polyesters produced according to this invention can be co-polymerized with monomers having at least one unsaturated organic group and which are capable of radical polymerization or at least of radical co-polymerization. The unsaturated organic compounds which are most suitable for the co-polymerization with the unsaturated polyesters of this invention are, for example, styrene, chlorostyrenes as 2-5 dichlorostyrene, diallylphthalate and triallylcyanurate; however, vinylesters such as vinyl formiate, vinyl acetate, vinyl trichloroacetate, vinyl propionate, vinyl benzoate can be co-polymerized with the unsaturated polyesters of this invention; also mono-, di-, tri- and tetra-allylesters of saturated and unsaturated mono-, di- and polycarboxylic acids such as diallylmaleate, di-allyldiglycolcarbonate, triallylphosphate and tetraallylsilicate, the corresponding ester of crotyl alcohol, α-methylallyl alcohol, methallyl alcohol, β-chloroallyl alcohol, β-methylcrotyl alcohol, etc., acrylic, chloroacrylic and methacrylic esters, acryl amide and methacrylamide, acrylonitrile, compounds as α-methyl-styrene, vinyl toluene, di- and trivinylphenol ethers, vinyl anisol, acenaphthylene, divinylbenzene, etc., and/or mixtures of these compounds, may likewise be co-polymerized.

The formation of the unsaturated polyesters may be carried out as a heterogeneous reaction, for example by heating xylene, aqueous formaldehyde and maleic anhydride with sulphuric acid as a catalyst under reflux.

As a rule, in the beginning of the heating all the solids dissolve in the two phases—namely, an aqueous and a non-aqueous phase; during heating more and more of the unsaturated polyester separates out into the non-aqueous phase. The polyester can easily be separated from the aqueous phase and from the products which crystallize during cooling. A suitable separation method is, for instance, the addition of an organic solvent for the unsaturated polyester to the reaction mixture, which results in the formation of two liquid layers followed by removal of the aqueous phase and subsequent removal of the solvent from the polyester by distillation. Benzene and monochlorobenzene may be used as solvents, as also chlorinated aliphatic hydrocarbons such as carbontetrachloride, chloroform, 1-1 dichloroethane, 1-2 dichloroethane, trichloroethane and trichloroethylene. Care should be taken in the distillation of the solvent from the polyester as too high distillation temperature results in further reactions which destroy the unsaturation of the polyester. Generally, distillation temperatures above 200° C. are to be avoided.

The aqueous phase with crystalline maleic acid and maleic anhydride can be used for the preparation of a subsequent quantity of unsaturated polyester by addition of a quantity of maleic acid or maleic anhydride and formaldehyde, corresponding with the quantity of these substances consumed in the formation of the polyester, and a new full charge of xylene. In this case the formaldehyde is not added as such but as trioxymethylene or paraformaldehyde.

The condensation reaction can also be carried out in a pressure vessel with a stirrer at a temperature above the boiling temperature of the main components of the system.

A polyester produced according to the invention can easily co-polymerize with one or more of the monomers mentioned on heating or on radiating with ultraviolet light. Co-polymerization on heating is preferably carried out in the presence of a polymerization catalyst.

Suitable catalysts are peroxides, hydroperoxides, ozonides and azo compounds. For this purpose preferably dibenzoylperoxide, 1-hydroxycyclohexylhydroperoxide-1, methylethylketone-peroxide and azodiisobutyronitrile may be used; also diacylperoxides such as di(p-chlorobenzoyl)peroxide, di(p-bromo-benzoyl)peroxide, di(dichlorobenzoyl)peroxide, diphthalylperoxide, disuccinylperoxide, acetylbenzoylperoxide, diacetylperoxide, di(chloroacetyl)peroxide, dilaurylperoxide, distearylperoxide and dioleylperoxide may be used; aldehydeperoxides such as hydroxyheptylperoxide and dibenzaldiperoxide, ketoneperoxides such as methylisobutylketoneperoxide and methylamylketoneperoxide, alkylhydroperoxides such as t-butylhydroperoxide and cumenehydroperoxide, peracids such as peracetic acid and perbenzoic acid, peresters such as t-butylperbenzoate, benzylperacetate, t-butylpermaleic acid, t-butylperphthalic acid and di-t-butyldiperphthalate, ozonides such as diisopropylene ozonide and di-isobutyleneozonide, or mixtures thereof, may also be used as catalysts.

Co-polymerization of the unsaturated polyester and the unsaturated monomeric compound may also be effected at normal temperature. For this purpose a polymerization activator should be added together with the polymerization catalyst, which activator activates the catalyst at normal temperature. For this purpose amines, such as dimethylaniline, diethylaniline, hexamethylenetetramine and triethanolamine, are suitable, as also special salts of heavy metals such as, for example, cobaltnaphthenate or cobaltheptenate.

Under similar reaction conditions the co-polymerization reaction proceeds more rapidly as the molecular weight of the unsaturated polyester is higher and also as the polyester contains more unsaturated acid.

The products obtained on co-polymerization may vary from elastic to hard, depending upon the structure and the molecular weight of the unsaturated polyester and upon the quantity and the nature of the monomer or monomer mixture used for the co-polymerization.

By varying the quantities of the polymerization catalyst and the activator and also by changing the reaction temperature, the gel time and the time of hardening can be varied at will.

The low-molecular polyesters generally do not give a hard product, as even after complete hardening the final product is of a rubbery-elastic nature.

As a result of this property, if these substances (i.e., low-molecular polyesters) are co-polymerized in small quantities with a monomer, which in itself gives brittle polymers, this brittleness is reduced. For example, the low-molecular polyesters of xylene with a molecular weight of less than 500 give, for example with 45% styrene, after hardening a rubbery-elastic substance.

High-molecular xylene polyesters with a molecular weight greater than 1100 co-polymerized with 45% styrene give very hard, practically insoluble polymers on complete hardening.

A mixture of the unsaturated xylene polyesters produced according to this invention with a molecular weight between 600 and 1100 and 45% styrene co-polymerizes into products which are gradual transitions between rubbery-elastic and hard products.

The acid used as catalyst in the condensation reaction for the production of the unsaturated polyester may be sulphuric acid, the acid concentration in the aqueous phase being preferably approximately 35%, but the concentration may vary between 0.1 and 65%. Other acids, as for example phosphoric acid, aromatic sulphonic acids and Friedel-Crafts catalysts such as $AlCl_3$ and $ZnCl_2$, may be used, and also aromatic sulphochlorides.

The preparation of the unsaturated polyester can also be effected as a homogeneous reaction without the presence of a water-phase. Instead of an aqueous formaldehyde solution, a substance giving formaldehyde and which does not contain water must then be used, as for example solid paraformaldehyde. Also in this case the catalyst is preferably sulphuric acid or an aromatic sulphonic acid such as, for example, paratoluene sulphonic acid. The sulphuric acid concentration may lie between 0.001% and 5%; however, the preferred sulphuric acid concentration lies between 0.01 and 1.5% by weight. If paratoluene sulphonic acid is used as the catalyst in the non-aqueous reaction, the concentration can be chosen between 0.1 and 10% by weight, preferably, however, between 1 and 3% by weight. However, other acids, such as phosphoric acid and Friedel-Crafts catalysts such as $AlCl_3$ and $ZnCl_2$, may also be used.

The polyesters can be prepared in contact with the air but the products obtained on condensing in the absence of oxygen are of a better quality.

The stirring velocity influences also the condensation reaction. On condensing in the presence of an aqueous phase only a slight quantity of polyester is formed without stirring. With stirring, the best properties, as a short gel time and a high-molecular weight, are obtained when this stirring is done slowly. In order to obtain the same result with quick stirring as with slow stirring, a longer condensation time is required under otherwise similar conditions. The same effect occurs during the condensation if no aqueous phase is present.

Co-polymerization of the unsaturated polyesters and the unsaturated monomers may also be carried out successfully if the mixture contains, besides the components already mentioned, other substances which may or may not have an influence on the co-polymerization. In the hardened product these inert or active substances can serve as fillers or dyes, reinforcements or plasticisers. The most important of these substances are glass, quartz, mica, clay, asbestos, calcium carbonate, calcium sulphate, titanium dioxide, antimony trioxide, cellulose, chlorinated biphenyls, tricresylphosphate and chloroparaffins. If the substance is used in the form of fibers or tissues, products with very favorable mechanical properties can be obtained. Also other important properties, such as water repellency, shrinkage on hardening, electric properties, combustibility, and adhesion to other materials, can often be considerably improved by the addition of specially chosen fillers.

For reinforcing purposes, tissues or fibers of glass, polyamides, polyvinylidenechloride, polyvinylchloride and polyglycolterephthalate can be advantageously used. Due to all these possibilities, mixtures of unsaturated polyesters prepared according to the invention with monomers, whether or not combined with fillers, pigments and resinforcing materials, constitute exceedingly desirable raw materials for casting resins, laminated materials, molding powders and plastic bodies and objects which are made with or without pressure and with reinforcing materials which may or may not have been preformed.

The unsaturated polyesters produced according to this invention may also be used, with or without co-polymerization with monomers, as binding agents in lacquers.

Thus, for example, the unsaturated polyester prepared from xylene, formaldehyde and maleic acid can be combined with wood oil, castor oil and styrenized alkyd resins to form suitable lacquers.

The unsaturated polyesters may also be applied as casting resin by dissolving them in a monomer to a more or less viscous solution and adding a polymerization catalyst and, if desired, a polymerization activator, after which the solution is cast in a mold or around an object in a mold, after which the mixture is allowed to gelatinize at room temperature, or elevated temperature, and is subsequently allowed to harden. During the hardening after the gelation, reaction heat is liberated. When no heat is applied, the temperature always increases during curing, depending upon the form and size of and upon possible cooling of the molded object and the quantity of catalyst. If desired, a quantity of filler, such as precipitated calcium carbonate, may be added to the casting resin, which results in a decrease in the shrinkage during hardening. Also, a quantity of chlorinated biphenyl and antimony trioxide or a similar product may be added to the casting resin, giving a product with improved fireproof properties.

In the manufacture of laminated products, the laminating fabrics, porous sheets or plates are soaked as completely as possible with a solution of the unsaturated polyester in a monomer in which generally a slight quantity of a polymerization catalyst and, if desired, also a polymerization activator is present. After impregnation (which can be done also with a plurality of layers simultaneously on a gauge or matrix), a plurality of layers of this laminated material are hardened to produce a laminate product in either a flat or other shape, with or without pressure. Such laminated reinforced products have very good mechanical and electrical properties, depending on what laminating material is impregnated with the unsaturated polyester solution. Suitable materials are, among others, glass mats, glass fabrics, paper, natural and synthetic fabrics, for example of rayon, cotton sisal, jute, linen, polyamides, polyglycolterephthalates, asbestos, polyacrylonitrile, etc.

Fillers such as calcium carbonate or calcium sulphate may be added to the solution of the unsaturated polyester used for the impregnation. In order to obtain special colors, inert pigments and dyes may be added which may also be done with the other applications of these polyesters. Also various reinforcing materials may be used together for the production of one product.

Molding compounds can be prepared from unsaturated polyesters made according to this invention as follows: A quantity of unsaturated polyester is dissolved in a monomer having at least one unsaturated organic group and capable of undergoing radical polymerization, such as, for example, styrene or diallylphthalate or a mixture of the two. Subsequently a polymerization catalyst is dissolved therein (for example, 1% by weight of benzoylperoxide). The solution obtained is subsequently homogeneously mixed in a mixer with such a quantity of an organic or inorganic filler and a small quantity of a lubricant such as, for example, zinc stearate or aluminum stearate, that a putty-like mass is formed. This putty-like mass may be subsequently granulated. The grains or the putty-like mass may be used as a molding substance which very quickly hardens at a low pressure and temperature (for example, 30 kg./cm.$^2$ and 140° C.).

Molding compounds which harden still more quickly can be produced by partially pre-polymerizing the putty-like molding compound on a hot roller. This results in a molding resin having less flow on molding and, at the same time, hardening is effected more quickly. The keeping qualities of these molding compounds or grains can be improved by adding thereto a small amount of either thiophenol, mono-oxime of quinone, mono-oxide of 2-6 dichloroquinone, imine chloride of quinone or 2-6 dichloroquinone, dihydroxydiphenyl, N-phenyl-2-hydroxy-3 naphthamide or a mixture of these substances. Clay, asbestos, α-cellulose, short glass fibers, etc., may, for instance, also be used as fillers.

Molded objects can also be produced by placing a preform of a reinforcing fibrous material, for example of glass fibers, in a matrix and subsequently pouring over it a solution of an unsaturated polyester according to the invention dissolved in a monomer with a polymerization catalyst (and, if necessary, also containing an activator and a filler), and hardening into the desired shape after closing the hot matrix.

The unsaturated polyesters according to the invention when applied to the fibers of a pre-form in a small quantity (with or without a monomer and a polymerization catalyst) are also suitable to cement the pre-form into a manageable, movable shape, whether or not the application on the pre-form is followed by heating.

EXAMPLES I TO XXIV

All of the following unsaturated polyesters have been prepared by heating the reaction components for some time in a reaction vessel provided with a stirrer, a thermometer and a reflux cooler while stirring on a bath of constant temperature. Subsequently, a solvent for the unsaturated polyester is added at 80 to 120° C., after which, if necessary, stirring is continued at the same temperature until the polyester has been completely dissolved. The solvent used in all of these examples was benzene. If the unsaturated polyester has been prepared in the presence of an aqueous phase, the polyester solution in the non-aqueous phase is separated from the aqueous phase and the precipitated non-converted carboxylic acids and/or carboxylic anhydrides present therein. If the unsaturated polyester has been formed without the presence of an aqueous phase, the non-converted, non-dissolved carboxylic acids and/or carboxylic anhydrides are filtered off. The remaining solution of the unsaturated polyester in benzene can be separated from the unchanged starting materials which are still present in this solution by washing the unchanged starting materials from the benzene solution of the polyester with water. The formation of a stable emulsion during washing can as a rule be avoided by washing with a hot, saturated solution of sodium chloride or sodium sulphate. If a stable emulsion is formed, it is easily broken by centrifuging or by adding a small amount of a diluted sulphonated hydrocarbon solution such as, for example, Teepol.

The unsaturated polyester produced according to these examples is obtained in a pure state by subsequently removing the solvent by distillation at normal pressure, followed by vacuum distillation. The distillation temperature should be below the temperature at which the unsaturated character of the polyesters is destroyed and preferably should be completed at temperatures below 200° C.

The unsaturated polyesters obtained according to Examples I to XXIV are characterized by the molecular weight, the acid number, the saponification number and the gel time under standard conditions in the chart of these examples given below. The molecular weight was determined cryoscopically in benzene as solvent. The acid number and the saponification number are the number of milligrams of potassium hydroxide required to neutralize or to saponify completely 1 gm. of the unsaturated polyester. The gel time was determined by adding 0.04 gm. dimethylaniline as polymerization activator to a solution of 5 gm. of the unsaturated polyester in 4 gm. of styrene with 0.05 gm. dibenzoylperoxide, in a test tube and by measuring the time elapsing at 20° C. between the addition of the dimethylaniline and the gelation of the solution to the point where the flow disappeared. The results obtained in the production of a number of unsaturated polyesters prepared according to the invention and the reaction conditions under which they were prepared are indicated in the following table.

*Examples I to XXIV*

| Example No. | Parts by weight aromate or ketone | Parts by weight carboxylic acid or anhydride | Parts by weight aldehyde | Catalyst, parts by weight | Bath temp., in ° C. |
| --- | --- | --- | --- | --- | --- |
| I | 106 xylene | 294 maleic anhydride | 168 formalin (36%) | 27.6 $H_2SO_4$ (96%) | 100 |
| II | 92 toluene | 98 M.A. | 60 paraformaldehyde | 0.5 $H_2SO_4$ (100%) | 100 |
| III | 48 anisol | 147 M.A. | 144 formalin (20.7%) | 37.6 $H_2SO_4$ (96%) | 100 |
| IV | 147 orthodichlorobenzene | 98 M.A. | 60 paraform | 6.1 $H_2SO_4$ (96%) | 100 |
| V | 53 xylene | 219 adipic acid | 83 formalin (36%) | 265 $H_2SO_4$ (34%) | 100 |
| VI | do | 109 adipic acid 73.5 M.A. | do | 265 $H_2SO_4$ (34%) | 100 |
| VII | do | 147 M.A. | do | 265 $H_2SO_4$ (34%) | 100 |
| VIII | 106 xylene | 116 fumaric acid | 60 paraform | 4 $H_2SO_4$ (96%) | 120 |
| IX | 132 tetraline | 98 M.A. | do | 0.29 $H_2SO_4$ (96%) | 100 |
| X | 106 ethyl benzene | 98 M.A. | do | 1.49 $H_2SO_4$ (96%) | 120 |
| XI | 146 cyclo hexanone | 98 M.A. | do | 0.33 $H_2SO_4$ (96%) | 100 |
| XII | 127 diphenyl 38 diphenyl oxide | 98 M.A. | do | 0.35 $H_2SO_4$ (96%) | 100 |
| XIII | 106 xylene | 294 M.A. | 166 formalin (36%) | 81 $H_3PO_4$ | 100 |
| XIV | do | 114 maleic acid | 60 paraform | 5.7 paratoluene sulphonic acid | 100 |
| XV | do | 98 M.A. | do | 11 $ZnCl_2$ | 100 |
| XVI | 120 acetophenone | 98 M.A. | do | 0.30 $H_2SO_4$ (96%) | 100 |
| XVII | 106 xylene | 294 M.A. | 30 paraform., 166 formalin (36%). | 31.7 $H_2SO_4$ (96%) | 120 |
| XVIII | do | 294 M.A. | 168 formalin (36%) | Layer of water saturated with $ZnCl_2$. | 100 |
| XIX | do | 294 M.A. | 90 paraform.+106 water | 33.5 $H_2SO_4$ (95%) | 120 |
| XX | 54 xylene | 44 aconitic acid | 15 paraform | 1.85 $H_2SO_4$ (96%) | 120 |
| XXI | 100 methylisobutylketone | 98 M.A. | 60 paraform | 0.65 $H_2SO_4$ (96%) | 120 |
| XXII | 53 xylene in 200 N-butyl ether as solvent. | 48 M.A. | 30 paraform | 1.85 $H_2SO_4$ (96%) | 120 |
| XXIII | 106 xylene | 86 crotonic acid | 60 paraform | 3.69 $H_2SO_4$ (96%) | 120 |
| XXIV | 35 xylene | 43 itaconic acid | 20 paraform | 1.85 $H_2SO_4$ (96%) | 120 |

*Examples I to XXIV*—Continued.

| Example No. | Reaction time in hours | Distillation temperature in °C. | Yield of polyester in pts. by wt. | Mol. wt. polyester | Acid number polyester | Saponification number polyester | Gel. time polyester in minutes | Nature of unsaturated polyester | Color of unsaturated polyester |
|---|---|---|---|---|---|---|---|---|---|
| I | 8 | 70 | 110 | 870 | 40 | 141 | 10 | Tough solid substance | Light-yellow. |
| II | 7½ | 70 | 70 | 500 | 18 | 75 | 420 | Thick—viscous | Do. |
| III | 6½ | 70 | 50 | 1,300 | 29 | 91 | 105 | Tough solid substance | Yellowish brown. |
| IV | 15 | 70 | 25 | 319 | 19 | 170 | >1,200 | Viscous | Do. |
| V | 3⅔ | 70 | 50 | 390 | 51 | 158 | (¹) | do | Light-yellow. |
| VI | 3⅔ | 70 | 30 | 635 | 59 | 200 | 150 | Thick—viscous | Do. |
| VII | 3⅔ | 70 | 30 | 530 | 54 | 208 | 90 | Tough solid substance | Do. |
| VIII | 6½ | 70 | 110 | 490 | 9 | 39 | 150 | Thick—viscous | Yellowish brown. |
| IX | 1⅓ | 70 | 140 | 550 | 34 | 80 | 110 | Solid | Yellow. |
| X | 1½ | 70 | 110 | 930 | 36 | 102 | 15 | Tough solid | Yellowish brown. |
| XI | 2½ | 70 | 160 | 390 | 75 | 140 | 600 | Thick—Viscous | Brown. |
| XII | 1¹⁰⁄₁₀ | 70 | 160 | 760 | 25 | 61 | 4 | Solid | Yellow. |
| XIII | 24 | 70 | 112 | 330 | 48 | 102 | 210 | Viscous | Light-yellow. |
| XIV | 8 | 70 | 110 | 580 | 34 | 210 | 20 | Thick—viscous | Do. |
| XV | 3 | 70 | 92 | | 26 | 75 | 22 | Tough—viscous | Do. |
| XVI | 7½ | 70 | 166 | 360 | 84 | 173 | >1,200 | Viscous | Brown. |
| XVII | 1 | 70 | 120 | 1,250 | 40 | 146 | 6 | Solid | Light-yellow. |
| XVIII | 6 | 70 | 120 | | 38 | 90 | 36 | Viscous | Do. |
| XIX | 1 | 70 | 155 | 1,370 | 49 | 149 | 5 | Solid | Yellow. |
| XX | 6 | 70 | 50 | 470 | 17 | 72 | >600 | Thick—viscous | Brownish yellow. |
| XXI | 5 | 70 | 122 | 380 | 80 | 173 | >600 | Viscous | Brown. |
| XXII | 6 | 70 | 50 | 330 | 81 | 190 | 360 | Thin—viscous | Orange. |
| XXIII | 7½ | 70 | 131 | 300 | 95 | 213 | >600 | do | Light-yellow. |
| XXIV | 6½ | 70 | 48 | 821 | 51 | 183 | 21 | Tough—viscous | Do. |

¹ Does not gelatinize.
M.A.=maleic anhydride.
No. XIX prepared in a nitrogen atmosphere.

EXAMPLE XXV

Into a reaction vessel, provided, with a stirrer, a thermometer and a reflux cooler, placed in an oil bath of 120° C., 106 parts by weight of xylene are added, while stirring, to a mixture of 98 parts by weight of powdered maleic anhydride, 60 parts by weight of powdered paraformaldehyde and 0.35 part by weight of sulphuric acid (100%) in 20 minutes, after which stirring is continued for another 45 minutes. Subsequently 800 parts by weight of carbontetrachloride are added, after which the heating bath is cooled to 90° C., at which temperature stirring is continued for another 5 hours. After cooling to room temperature (20° C.) the solution of the unsaturated polyester in carbontetrachloride is filtered off, after which the carbontetrachloride is completely removed by vacuum distillation at 50° C. 135 parts by weight of unsaturated polyester are obtained as a white powder.

Molecular weight 650, acid number 34, saponification number 96, gel time 8 minutes.

EXAMPLE XXVI 80 gm. of an unsaturated polyester of xylene formaldehyde and maleic acid (mol. weight 1250, acid number 34, saponification number 90) are dissolved at room temperature (20° C.) in 20 gm. styrene containing 0.5 gm. 1-hydroxycyclohexylhydroperoxide-1. Subsequently 1.25 cc. of a 10% solution of cobaltnaphthenate in styrene are added, after which the solution thus obtained is poured into a vessel of 150 cc. This solution gelatinizes after ½ hour and hardens after 1½ hours. After the gelation the temperature of the mixture increases from 20° C. to 60° C. during hardening. A hard elastic body having the shape of the vessel is formed. An acetone extraction number was determined for the hard elastic cylinder obtained; it was found that 10% by weight of the hardened product could be extracted.

EXAMPLE XXVII 150 gm. of unsaturated polyester of the type produced by Example XXV and 50 gm. of castor oil are stirred until a clear solution is obtained, while heating at a temperature below 150° C. The mixture is subsequently dissolved in 200 gm. of styrene containing 2 gm. of dibenzoylperoxide, after which heating is effected for an hour at 140° C. In this case a clear, very elastic product is obtained.

EXAMPLE XXVIII 65 gm. of an unsaturated polyester prepared by the reaction of xylene, formaldehyde and maleic anhydride (mol. weight 910, acid number 36, saponification number 132) are dissolved together with 3 gm. of a paste consisting of dibenzoylperoxide in tricresylphosphate (50% by weight of dibenzoylperoxide) in 35 gm. of styrene.

On a film of cellophane 15 layers of glass fiber (15 x 15 cm.), having a total weight of 45 gm., arranged one on top of the other, are subsequently successively impregnated with 45 gm. of the unsaturated polyester solution. Whenever a fresh layer of glass fiber is applied, the air bubbles must be well removed with a brush. The laminated impregnated plate is subsequently covered with a cellophane film, after which the plate is hardened at 100° C. between two glass plates upon which a weight of 1 kg. has been placed.

The laminated plate obtained has excellent mechanical and electrical properties.

EXAMPLE XXIX 110 gm. of unsaturated polyester prepared by the reaction of xylene, formaldehyde and maleic acid (mol. weight 1000, acid number 38, saponification number 101) and 7.5 gm. of a catalyst paste (3.75 gm. of dibenzoylperoxide in 3.75 gm. of tricresylphosphate) are dissolved in 60 gm. of styrene. This solution is homogeneously mixed with 240 gm. of bentonite and 100 gm. of asbestos as filler and 10 gm. of zinc stearate as lubricant on a cold roller. During the process a sheet of a putty-like consistency is formed, which sheet can be granulated.

These grains can, for example, be pressed to plates by pressing in a matrix at 140° C. for one minute at a pressure of 15 kg. per cm.²

EXAMPLE XXX 110 gm. of an unsaturated polyester prepared by the reaction of xylene, formaldehyde and maleic acid (mol. weight 510, acid number 41, saponification number 118) and 7.5 gm. of catalyst paste as used in Example XXIX are dissolved in 30 gm. of styrene and 30 gm. of diallylphthalate. On mixing this solution with 240 gm. of bentonite and 100 gm. of asbestos as filler and 10 gm.

of zinc stearate as lubricant on a cold roller a molding compound results which is a doughy sheet which can hardly be granulated. This dough can be pressed to plates by pressing in a matrix at 140° C. at a pressure of 25 kg. per cm.² for one minute.

EXAMPLE XXXI 110 gm. of an unsaturated polyester (identical with the one in Example XXIX) and 7.5 gm. of catalyst paste as used in Example XXIX are dissolved in 60 gm. of diallylphthalate. This solution is homogeneously mixed to a molding compound with 240 gm. of bentonite and 100 gm. of asbestos as filler and 10 gm. of zinc stearate as lubricant. A somewhat leathery sheet which can easily be granulated results.

The grains can be pressed (for example to plates) by pressing in a matrix at 140° C. at a pressure of 25 kg. per cm.² for one minute.

EXAMPLE XXXII

Equal parts by weight of wood oil and unsaturated polyester produced by the reaction of xylene, formaldehyde and maleic acid, with a molecular weight of 565, an acid number of 42 and a saponification number of 112 are brought together and are heated to 280° C. in about 20 minutes. Cooling is subsequently effected quickly (for example by adding part of a previous charge) and the product is dissolved in an equal quantity by weight of styrene. This solution is stable.

When this solution is applied as a thin layer on glass, wood or metal, it gives a colorless, elastic, well-adhering layer after heating for ¾ hour at 150° C. The quality of the varnish can be improved by adding thereto the same quantity, by weight, of a solution of the same unsaturated polyester in styrene and, if required, a peroxide and a slight quantity of a compound of Co, Ca, Mn, Zn or the like, reacting as a siccative.

For the preparation of a colored lacquer, pigments may also be added, which preparation is effected as is customary with synthetic paints in the paint industry.

With the same lacquer, an elastic film is obtained on airdrying after 24 hours. In this case styrene can fully or partly be replaced by a solvent which is rich in aromatic hydro carbon compounds.

EXAMPLE XXXIII

Equal parts by weight of castor oil and a polyester such as used in Example XXXII were heated to 140° C. and subsequently cooled and dissolved in styrene. This solution has the same properties as the solution of Example XXXII.

EXAMPLE XXXIV 1 part of an unsaturated polyester such as used in Example XXXII is dissolved in 4 parts of a 76% solution of a styrenized alkyd resin in xylene of 2.5 cp. A siccative containing Co, Mn, or Ca is added to this, as also a few drops of a mixture of ditertiary butylperoxide and tertiary butylhydroperoxide. The varnish thus obtained can be applied with a brush contrary to the original styrenized alkyd resin. It gives an excellent elastic, scratch-free, well-adhering, colorless film, with or without heating.

All of the unsaturated aromatic polyesters produced according to the above examples and similar polyesters produced according to the teaching of this invention have on the average more than two centers of reactivity, i.e. on the average more than two function groups per molecule of the polyester. For example, where maleic acid or maleic anhydride has been used in the examples, the resulting polyester has at least on the average more than one mole of the maleic radical per mole of the polyester and a value of reactivity of more than two with reference to other co-polymerizable materials. These unsaturated polyesters therefore provide materials which are particularly suitable for co-polymerization with monomers having similar centers of reactivity to provide polymerization products of various characteristics.

While I have given several examples and described various methods by which my invention may be practiced, it will be understood that these are for illustrative purposes and that various modifications and changes can be made from the examples and illustrations given within the spirit of my invention and the scope of the following claims.

I claim:

1. As a product of manufacture, an unsaturated polyester having an average of more than two centers of olefinic unsaturation reactivity capable of free-radical co-polymerization per molecule, formed by heating to a temperature between about 100° C. and about 150° C. and in the presence of an acid condensation catalyst selected from the group consisting of sulfuric acid, orthophosphoric acid, p-toluene-sulfonic acid and zinc chloride, a mixture consisting essentially of a cyclic compound selected from the group consisting of xylene, toluene, anisole, o-dichlorobenzene, tetralin, ethyl-benzene, cyclohexanone, diphenyl, diphenyl oxide and acetophenone, an olefinic carboxylic acid selected from the group consisting of maleic acid, maleic acid anhydride, fumaric acid, aconitic acid, crotonic acid and itaconic acid, and an aldehyde selected from the group consisting of formaldehyde and paraformaldehyde, and distilling the residual polyester solution at a temperature below 200° C. to remove the solvent and unreacted volatile starting materials and to preserve the olefinic unsaturation in said polyester.

2. As a product of manufacture, an unsaturated polyester having an average of more than two centers of olefinic unsaturation reactivity capable of free-radical co-polymerization per molecule, formed by heating to a temperature between about 100° C. and about 150° C. in the presence of sulfuric acid as a condensation catalyst and in the presence of adipic acid, a mixture consisting essentially of xylene, formaldehyde and maleic acid anhydride, and distilling the residual polyester solution at a temperature below 200° C. to remove the solvent and unreacted volatile starting materials and to preserve the olefinic unsaturation in said polyester.

3. The process of producing an unsaturated polyester having an average of more than two centers of olefinic unsaturation reactivity capable of free-radical co-polymerization per molecule, which comprises heating a mixture consisting essentially of a cyclic compound selected from the group consisting of xylene, toluene, anisole, o-dichlorobenzene, tetralin, ethyl-benzene, cyclohexanone, diphenyl, diphenyl oxide and acetophenone, an olefinic carboxylic acid selected from the group consisting of maleic acid, maleic acid anhydride, fumaric acid, aconitic acid, crotonic acid and itaconic acid, and an aldehyde selected from the group consisting of formaldehyde and paraformaldehyde, to a temperature between about 100° C. and 150° C. in the presence of an acid condensation catalyst selected from the group consisting of sulfuric acid, orthophosphoric acid, p-toluene-sulfonic acid and zinc chloride, dissolving the unsaturated polyester formed thereby in an inert organic solvent, separating water and water-soluble components from the polyester solution, and distilling the residual polyester solution at a temperature below 200° C. to remove the solvent and unreacted volatile starting materials and to preserve the olefinic unsaturation in said polyester.

4. The process of producing an unsaturated polyester having at least three centers of olefinic unsaturation reactivity capable of free-radical copolymerization per molecule, which comprises heating a mixture consisting essentially of xylene, formaldehyde and maleic acid anhydride to a temperature between about 100° C. and 150° C. in the presence of sulfuric acid as a condensation catalyst, dissolving the unsaturated polyester formed thereby in an inert organic solvent, separating water and water-soluble components from the polyester solution, and distilling the residual polyester solution at a temperature below 200° C. to remove the solvent and unreacted volatile starting materials and to preserve the olefinic unsaturation in said polyester.

5. The insoluble resinous co-polymers produced by heating a mixture consisting essentially of a cyclic compound selected from the group consisting of xylene, toluene, anisole, o-dichlorobenzene, tetralin, ethyl-benzene, cyclohexanone, diphenyl, diphenyl oxide and acetophenone, an olefinic carboxylic acid selected from the group consisting of maleic acid, maleic acid anhydride, fumaric acid, aconitic acid, crotonic acid and itaconic acid, and an aldehyde selected from the group consisting of formaldehyde and paraformaldehyde, to a temperature between about 100° C. and about 150° C. in the presence of an acid condensation catalyst selected from the group consisting of sulfuric acid, orthophosphoric acid, p-toluenesulfonic acid and zinc chloride, dissolving the unsaturated polyester having an average of more than two centers of olefinic unsaturation reactivity capable of free-radical co-polymerization per molecule formed thereby in an inert organic solvent, separating water and water-soluble components from the polyester solution, distilling the residual polyester solution at a temperature below 200° C. to remove the solvent and unreacted volatile starting materials and to preserve the olefinic unsaturation in said polyester, and co-polymerizing the unsaturated polyester with an unsaturated compound capable of free-radical co-polymerization selected from the group consisting of styrene, diallylphthalate and triallylcyanurate.

6. The insoluble resinous co-polymers produced by heating a mixture consisting essentially of xylene, formaldehyde and maleic acid anhydride to a temperature between about 100° C. and about 150° C. in the presence of sulfuric acid as a condensation catalyst, dissolving the unsaturated polyester having an average of at least three centers of olefinic unsaturation reactivity capable of free-radical co-polymerization per molecule formed thereby in an inert organic solvent, separating water and water-soluble components from the polyester solution, distilling the residual polyester solution at a temperature below 200° C. to remove the solvent and unreacted volatile starting materials and to preserve the olefinic unsaturation in said polyester, and co-polymerizing the unsaturated polyester with an unsaturated compound capable of free-radical co-polymerization selected from the group consisting of styrene, diallylphthalate and triallylcyanurate.

References Cited in the file of this patent

UNITED STATES PATENTS

| | | |
|---|---|---|
| 2,395,739 | Hersberger | Feb. 26, 1946 |
| 2,456,358 | Allen et al. | Dec. 14, 1948 |
| 2,634,251 | Kass | Apr. 7, 1953 |

FOREIGN PATENTS

| | | |
|---|---|---|
| 863,412 | Germany | Jan. 19, 1953 |
| 875,724 | Germany | May 7, 1953 |
| 871,645 | Germany | May 26, 1953 |

OTHER REFERENCES

Brewster: "Organic Chemistry," 2nd Edition, 1953, page 473 relied on.